(12) United States Patent
Sampath et al.

(10) Patent No.: US 8,199,739 B2
(45) Date of Patent: Jun. 12, 2012

(54) RETURN LINK TIME ADJUSTMENTS IN FDD OFDMA OR SC-FDM SYSTEMS

(75) Inventors: Hemanth Sampath, San Diego, CA (US); Jeremy H. Lin, San Diego, CA (US); Sunil K. Kandukuri Narayan, San Diego, CA (US); Sameer Vermani, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 554 days.

(21) Appl. No.: 12/408,355

(22) Filed: Mar. 20, 2009

(65) Prior Publication Data
US 2009/0245222 A1  Oct. 1, 2009

Related U.S. Application Data

(60) Provisional application No. 61/040,664, filed on Mar. 29, 2008.

(51) Int. Cl.
*H04J 1/00*  (2006.01)
(52) U.S. Cl. ........................................ 370/343
(58) Field of Classification Search ............. 370/434, 370/480, 503, 508, 389, 324, 281, 328, 349, 370/510, 516, 350, 432, 295, 441, 470, 472; 375/260, 340, 345, 354; 704/500
See application file for complete search history.

(56) References Cited

U.S. PATENT DOCUMENTS

| 7,492,828 B2* | 2/2009 | Keerthi ........................ 375/260 |
| 2008/0013478 A1* | 1/2008 | Rangan et al. ................ 370/328 |

FOREIGN PATENT DOCUMENTS

| GB | 2431323 | 4/2007 |
| WO | WO02073870 | 9/2002 |

OTHER PUBLICATIONS

International Search Report and the Written Opinion—PCT/US2009/037994, International Search Authority—European Patent Office—Jul. 20, 2009.

* cited by examiner

*Primary Examiner* — Chi Pham
*Assistant Examiner* — Alexander Boakye
(74) *Attorney, Agent, or Firm* — Larry Moskowitz; Abdollah Katbab

(57) ABSTRACT

A method for adjusting timing in a Frequency Division Multiplexing (FDM) system, including receiving a request to perform a timing correction, generating a time domain FDM symbol, and controlling the timing correction in the time domain FDM symbol by at least one of adjusting a length of a cyclic prefix, overlapping a portion of adjacent FDM symbols, adjusting a symbol windowing length, or utilizing a return link (RL) silence interval.

50 Claims, 6 Drawing Sheets

RETURN LINK TIME ADJUSTMENTS IN FDD OFDMA OR SC-FDM SYSTEMS

CLAIM OF PRIORITY UNDER 35 U.S.C. §119

The present Application for Patent claims priority to Provisional Application No. 61/040,664 entitled "METHOD AND SYSTEM FOR TIME ADJUSTMENTS IN AN FDD OFDMA SYSTEM" filed Mar. 29, 2008, and assigned to the assignee hereof and hereby expressly incorporated by reference herein.

FIELD OF DISCLOSURE

The invention relates to communications in a telecommunications system, and more particularly to Access Terminal Return Link (RL) time adjustments in Frequency Division Duplexing (FDD) orthogonal frequency division multiple access (OFDMA) or single carrier frequency division multiple access (SC-FDMA) systems.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple (NT) transmit antennas and multiple (NR) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system may support a time division duplex (TDD) and/or frequency division duplex (FDD) systems. In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

In modern communication systems, timing is an important consideration and may be used to synchronize communications amongst a plurality of users, particularly in a synchronous OFDMA OR SC-FDM system. Base stations or Access Points (AP) may control the timing of mobile units or Access Terminals (AT) in order to mitigate possible interference caused to access terminals in the Return Link (RL) area/sector.

In TDD systems, each AT(s) may be positioned at different distances from the AP. Thus, an OFDM waveform from each client or AT may arrive at the AP at different instances in time. However, in TDD systems, each client or AT RL transmission may need to be aligned in time when received at the AP. Thus, if each RL transmission is not subsequently aligned at the AP (from a time perspective), then each client or AT may be creating interference with each other and the AP will not be able to decode any of the clients. Furthermore, since the Forward Link (FL) transmission may occur after the RL transmission in a TDD system, a delay in signals received at the AP may result in interference with the FL transmission.

In a TDD system, there are numerous silence intervals between subsequent AT transmissions where the AT is not transmitting data. Further, guard intervals are also utilized between the Forward Link (FL) and RL transmissions where no data transmission also occurs. Therefore, each AT may be able to advance/retard (or backoff) the RL or FL transmission such that it occurs earlier (or later) than expected (in time) in order to arrive synchronized at the AP. This concept is known as time retardation/advancement. Currently, the time retardation/advancement is only performed for TDD systems. However, in most FDD systems, the AT(s) transmit signals on the RL and FL continuously, resulting in little or no guard interval. Therefore, timing/synchronization is an unresolved issue in FDD systems. As a result, a need exists to account for timing adjustments in a FDD system. More specifically, a need exists for how the AT adjusts the RL timing in FDD systems.

SUMMARY

Exemplary embodiments of the invention are directed to systems and methods to adjust timing in a Frequency Division Multiplexing (FDM) system.

Accordingly, an embodiment can include a method for adjusting timing in a Frequency Division Multiplexing (FDM) system, comprising: receiving a request to perform a timing correction; generating a time domain FDM symbol; and controlling the timing correction in the time domain FDM symbol by at least one of adjusting a length of a cyclic prefix, overlapping a portion of adjacent FDM symbols, adjusting a symbol windowing length, or utilizing a return link (RL) silence interval.

Another embodiment can include an apparatus for synchronizing a Frequency Division Multiplexing (FDM) access terminal, comprising: means for receiving a request to perform a timing correction; means for generating a time domain FDM symbol; and means for controlling the timing correction in the time domain FDM symbol by at least one of adjusting a length of a cyclic prefix, overlapping a portion of adjacent FDM symbols, adjusting a symbol windowing length, or utilizing a return link (RL) silence interval.

Another embodiment can include an apparatus operable in a wireless communication system, the apparatus comprising: logic configured to receive a request to perform a timing correction; logic configured to generate a time domain FDM symbol; and logic configured to control the timing correction in the time domain FDM symbol by at least one of adjusting a length of a cyclic prefix, overlapping a portion of adjacent FDM symbols, adjusting a symbol windowing length, or utilizing a return link (RL) silence interval.

Another embodiment can include a computer-readable medium having instructions, which when executed by at least one processor, operates to provide processing of communications signals, the computer-readable medium comprising: instructions to receive a request to perform a timing correction; instructions to generate a time domain FDM symbol; and instructions to control the timing correction in the time domain FDM symbol by at least one of adjusting a length of a cyclic prefix, overlapping a portion of adjacent FDM symbols, adjusting a symbol windowing length, or utilizing a return link (RL) silence interval.

Another embodiment can include a method for determining a timing correction in a Frequency Division Multiplexing (FDM) system, comprising: receiving a transmission from an access terminal; determining a timing correction based on the received transmission; and transmitting the timing correction to the access terminal.

Another embodiment can include an apparatus for determining a timing correction in a Frequency Division Multiplexing (FDM) system, comprising: logic configured to receive a transmission from an access terminal; logic configured to determine a timing correction based on the received transmission; and logic configured to transmit the timing correction to the access terminal.

BRIEF DESCRIPTION OF THE DRAWINGS

The accompanying drawings are presented to aid in the description of embodiments of the invention and are provided solely for illustration of the embodiments and not limitation thereof.

FIG. 5b is a sample illustration of an exemplary embodiment of adjusting the cyclic prefix length within the context of the AT.

DETAILED DESCRIPTION

Figure 1:
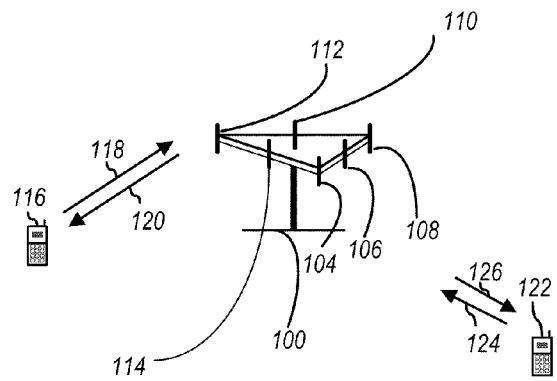
FIG. 1 illustrates a multiple access wireless communication system according to one embodiment.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMQR, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization, is a technique that has similar performance and essentially the same overall complexity as that of an OFDMA system. SC-FDMA signals have a lower peak-to-average power ratio (PAPR) because of its inherent single carrier structure. SC-FDMA has drawn great attention; especially regarding uplink communications where a lower PAPR greatly benefits the mobile terminal in terms of transmit power efficiency. Currently, it is a working assumption for an uplink multiple access scheme in 3GPP Long Term Evolution (LTE), or Evolved UTRA that SC-FDMA be utilized.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Further, it is understood that the methods and systems described below are applicable to any communication protocol that has timing considerations and therefore should not be explicitly limited to any of the specific example(s) shown below.

Referring to FIG. 1, a multiple access wireless communication system according to one embodiment is illustrated. An access point 100 (AP) may include multiple antenna groups; one including antenna elements 104 and 106, another including antenna elements 108 and 110, and an additional including antenna elements 112 and 114. In FIG. 1, only two antennas are shown for each antenna group, however it is understood by one of ordinary skill in the art, that more or fewer antennas may be utilized for each antenna group. Access terminal 116 (AT) is in communication with antenna elements 112 and 114, where antenna elements 112 and 114 transmit information to access terminal 116 over forward link 120 and receive information from access terminal 116 over reverse link 11 8. Access terminal 122 is in communication with antenna elements 106 and 108, whereas antenna elements 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate with is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals, scattered randomly through its coverage area, causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
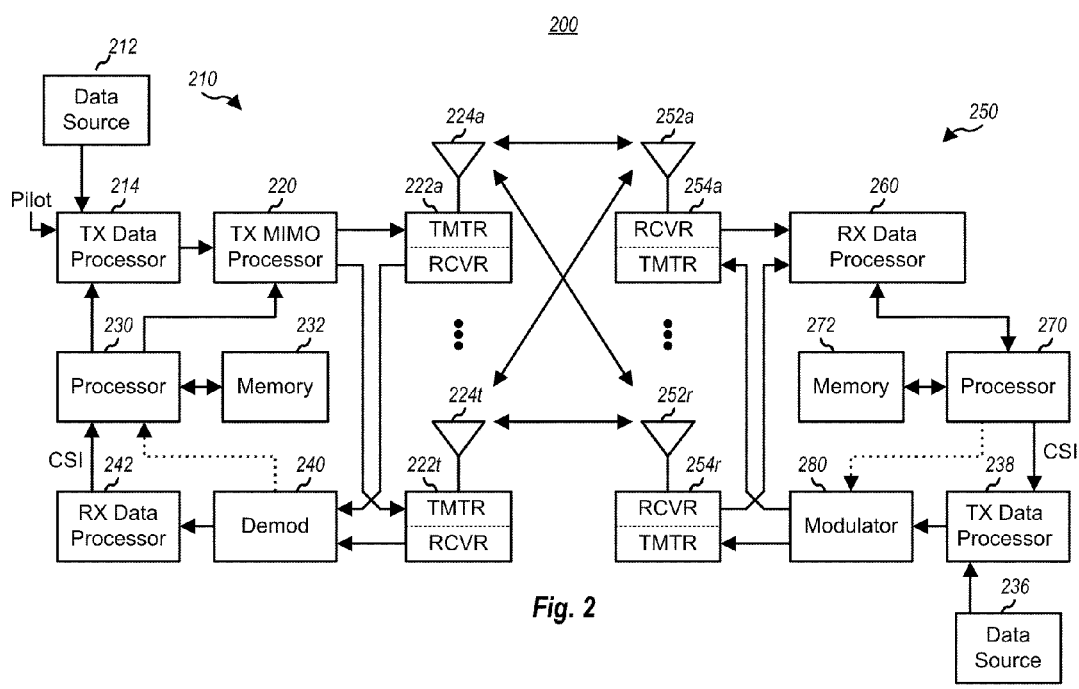
FIG. 2 is a block diagram of a communication system.

FIG. 2 is a block diagram of an embodiment of an AP 210 (also known as the access point) and an AT 250 (also known as an access terminal) in a MIMO system 200. At the AP 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each of transmitter 222a through 222t receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At AT 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from the $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at AP 210.

A processor 270 provides control to the AT 250 and provides an interface to memory 272, RX Data processor 260 and TX Data processor 238. A TX data processor 238 receives traffic data for a number of data streams from a data source 236, modulated by a modulator 280, conditioned by transmitters 254a through 254r, and transmitted back to AP 210.

At AP 210, the modulated signals from AT 250 are received by antennas 224, conditioned by receivers 222, demodulated by a demodulator 240, and processed by a RX data processor 242 to extract the reverse link message transmitted by the AT 250. A processor 230 provides control to the AP 210 and provides an interface to memory 232, TX Data processor 214 and TX MIMO Processor 220.

Figure 3:
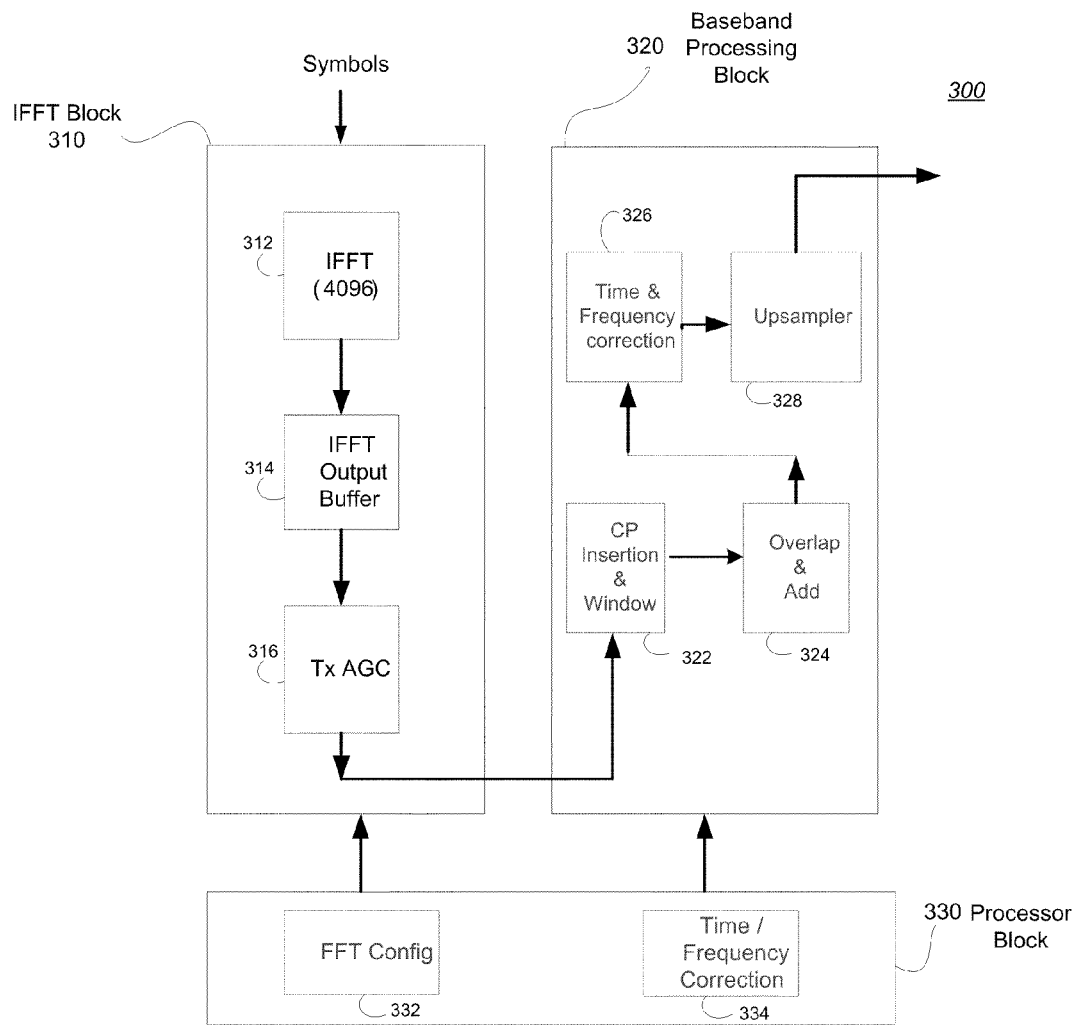
FIG. 3 is a general architecture block diagram illustrating one exemplary implementation of timing control in a receiver (transmitter).

FIG. 3 is a block diagram architecture 300 illustrating one exemplary implementation of a timing controller of the communication device 210 or 250 transmitting frames. Particularly, FIG. 3 illustrates the general architecture 300 which may contain IFFT Block 310 and Baseband Processing Block 320. The IFFT Block 310 may process modulation symbols received from the OFDMA modulator or the SC-FDM modulator (not shown). Further, the IFFT Block 310 and Baseband Processing Block 320 are coupled to Processor Block 330. In one embodiment, Processor Block 330 may use firmware processor such as an ARM processor or a DSP.

In the exemplary system, the Processor Block 330 may contain firmware capabilities which enable the Baseband Processing Block 320 to advance or retard timing. In the exemplary system, Processor Block 330 may contain firmware including an FFT Configuration Module 332 and a Time/Frequency Correction Module 334. The FFT Configuration Module 332 may specify various parameters of the FFT engine such as FFT size, scaling factors etc.

The Time/Frequency Correction Module 334 may contain an algorithm (shown in FIGS. 5a and 5b) for determining a timing advance/backoff. The timing advance/backoff can be performed by the AT in order to ensure that any signals transmitted by the AT can arrive synchronously (at a pre-determined time instant) at the AP. As a result, the AP can receive numerous signals from multiple clients which can arrive synchronously at the AP. The Time/Frequency Correction Module 334 can instruct the Baseband Processing Block 320 to perform timing advance/backoff. Thus, the Time/Frequency Correction Module 334 may instruct the Baseband Processing Block 320 to change the cyclic prefix and any other window parameters. The Time/Frequency Correction Module 334 may compute the timing advancement/retardation in units of number of chips. For every OFDM or SC-FDM symbol, the Time/Frequency Correction Module 334 may have the ability to instruct the Baseband Processing Block 320 to advance or retard timing by passing the cyclic prefix and windowing length parameters via a task list that controls the Baseband Processing Block 320.

As a result, in some embodiments, hardware (e.g., main processor) operations for implementing the features described herein can be made seamlessly because of the integration of the processor block 330 and the use of tasks controlled by firmware.

In this exemplary arrangement, IFFT Block 310 may contain an IFFT Engine 312 having, for example, an IFFT size of 4096. However, it is understood that other sizes may be used according to design preference. IFFT Block 310 may receive OFDMA modulation symbols or SC-FDM modulation symbols. IFFT engine 312 can process OFDMA modulation symbols or SC-FDM modulation symbols. The IFFT Engine 312 performs an inverse fast fourier transform on the data received from an OFDMA modulator or SC-FDM modulator (not shown). The output of the IFFT Engine 312 is fed to an IFFT Output Buffer 314. The IFFT Output Buffer 314 may store the output for further processing. From the IFFT Output Buffer 314, the data is sent to the Baseband Processing Block 320, after an optional Tx Automatic Gain Control (AGC) 316. The implementation of IFFT-to-AGC data manipulation is well known in the art and is therefore, not further elaborated.

In the Baseband Processing Block 320, the data is forwarded to the Cyclic Prefix (CP) Insertion & Window Block 322 that performs CP timing and adjustments to the data/frames. The Processor Block 330 may control the CP Insertion & Window Block 322. The output of the CP Insertion & Window Block 322 is fed to the Overlap & Add Block 324 where overlapping and adding of frames are performed. The overlapped and added frames are then forwarded to the Time & Frequency Correction Block 326 where further adjustments to the frame's size and/or blocks within the frame(s) may be managed to allow synchronization. Afterwards, the frames are upsampled by Upsampler Block 328 and output from the Baseband Processing Block 320 with the appropriate synchronization/timing.

Figure 4:
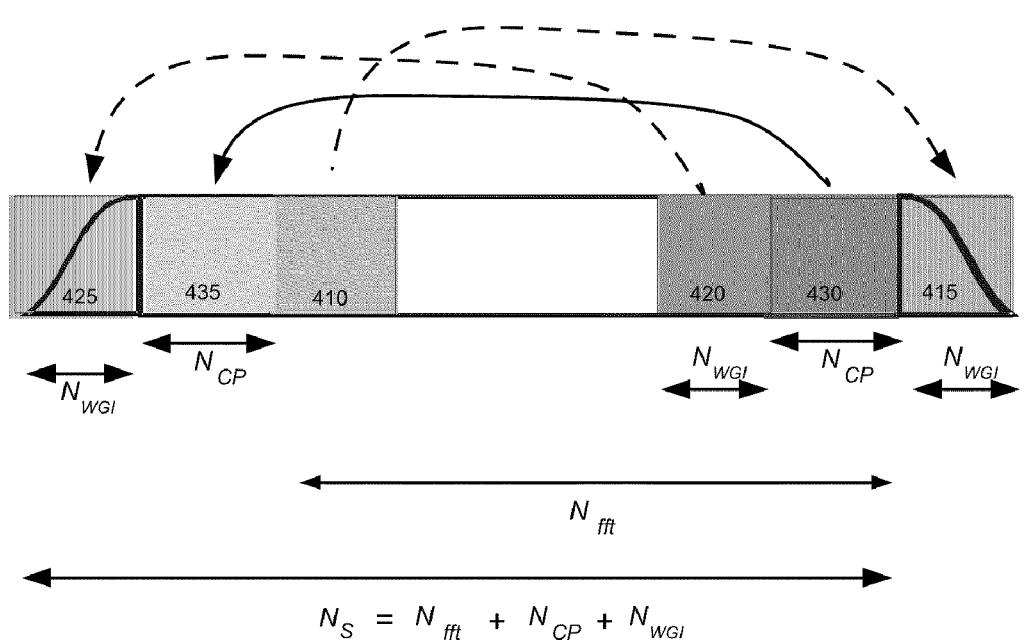
FIG. 4 is a diagram illustrating overlaying of the CP intervals according to an exemplary embodiment.

FIG. 4 is a diagram 400 illustrating the addition of the cyclic prefix and window in an OFDM or SC-FDM symbol, as one possible implementation of the methods described herein. Here $N_{fft}$ represents the IFFT size, which is also the number of subcarriers in an OFDM symbol or SC-FDM symbol—512, 1024, 2048, etc. $N_{WGI}$ represents the number of oversampled chips in the windowing guard interval. $N_{CP}$ represents the number of oversampled chips in the cyclic prefix of the phy-frame. $N_S$ represents the effective OFDM symbol or SC-FDM symbol duration in terms of oversampled chips. As can be seen by the "arrows" in FIG. 4, in order to add the cyclic prefix and windowing guard at the beginning of the OFDM symbol, NCP+NWGI chips from the end of the OFDM symbol are added to the beginning of the OFDM symbol. The 1$^{st}$ NWGI chips of the resulting waveform are multiplied by a windowing waveform to smooth the transition at the beginning of the resulting waveform.

Similarly, in order to add the windowing guard at the end of the OFDM symbol, NWGI chips from the beginning of the OFDM symbol are added to the end of the OFDM symbol. Thus, the last NWGI chips of the resulting waveform are multiplied by a windowing waveform to smooth the transition at the end of the resulting waveform.

In accordance with the methods described above, $N_S = N_{fft} + N_{CP} + N_{WGI}$, where $N_{fft}$ corresponds to a frame containing $N_{WGI}$ 410, $N_{WGI}$ 420, and $N_{CP}$ 430. These time intervals (equivalently speaking) are copied to the ends of the frame—$N_{WGI}$ 410 to $N_{WGI}$ 415, $N_{WGI}$ 420 to $N_{WGI}$ 425, and $N_{CP}$ 430 to $N_{CP}$ 435. Thus, by examining the arrangement shown herein, and recognizing that increasing or decreasing the cyclic prefix size, the overall frame duration ($N_S$) may be adjusted to enable synchronization. As a result, timing and/or synchronization adjustments may be performed within the cyclic prefix interval by adjusting the length of the cyclic prefix block.

Figure 5A:
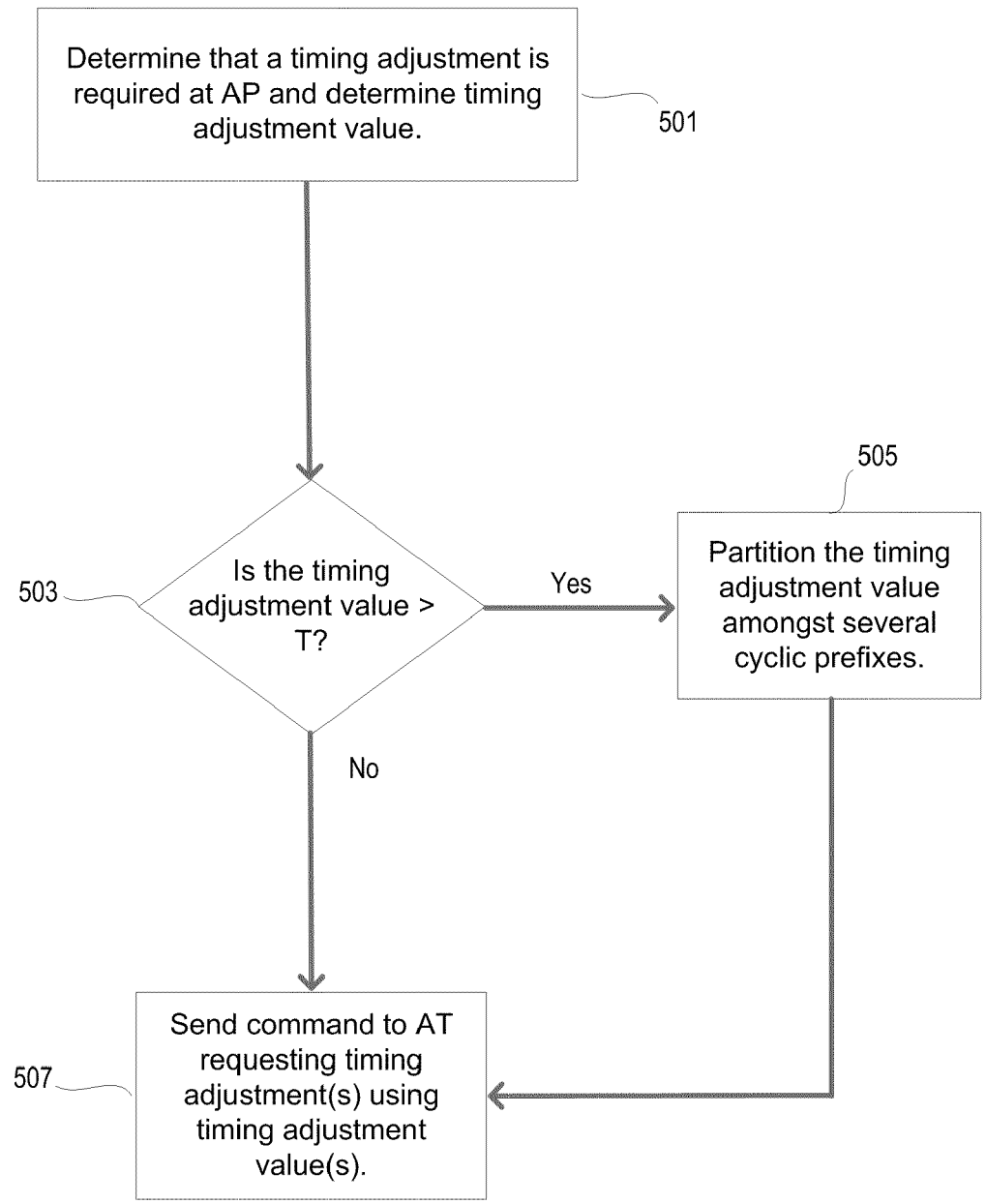
FIG. 5a is a sample illustration of an exemplary embodiment of adjusting the cyclic prefix length within the context of the AP.

FIG. 5a illustrates an exemplary embodiment of adjusting the cyclic prefix length within the context of the AP, as one possible implementation of the methods described herein.

At step 501, the AP may determine that a timing adjustment of the cyclic prefix is required at the AT. Further, the AP may also determine the actual timing adjustment value based on a ranging protocol. The ranging protocol is a process which allows the AP to determine the timing offset of each AT, based on the time of arrival of a pre-determined waveform transmitted by the AT. The ranging protocol is well-known and will not be described further herein.

At step 503, the AP may determine if the timing adjustment value is larger than a value T. The value T may be a small fraction of the Cyclic Prefix length, for example 25% of the length of the cyclic prefix. Further, the purpose of the cyclic prefix is to enable the OFDMA or SC-FDM system to effectively mitigate delay-spread. Therefore, a large T value will make the OFDMA or SC-FDM system more susceptible to delay spread, as this will reduce the effective length of the cyclic prefix. Thus, in selecting the value T a trade-off between the ability to handle delay spread vs. the magnitude of the timing-correction value is made. If the AP determines that the timing adjustment value is greater than T, then the process proceeds to step 505. If the AP determines that the timing adjustment value is smaller than T, then the process proceeds to step 507.

At step 505, the AP may partition the timing adjustment value of the cyclic prefix to span across several cyclic prefixes within a frame, as opposed to spanning a single cyclic prefix within a frame. This allows each partitioned timing adjustment value to be smaller than the value T. Therefore, the timing adjustment value of the cyclic prefix may be divided amongst several cyclic prefixes as opposed to being implemented with just a single cyclic prefix. Afterwards, the process proceeds to step 507.

At step 507, the AP may send a command to the AT(s) requesting that the AT(s) implement the timing adjustment(s) of the cyclic prefix by utilizing the timing adjustment value(s).

It is noted that FIG. 5a is one possible implementation of the concepts described herein and that other embodiments may exist. For example, the process described in FIG. 5a may be implemented by adjusting the OFDM or SC-FDM symbol windowing length to achieve a timing advance/retard effect. Furthermore, the process described in FIG. 5a may also be implemented by utilizing RL silence intervals as opportunities to advance/retard it's RL transmission. For example, the AT may use the 1$^{st}$ RL frame following the silence interval to advance (retard) its transmission. This approach may not lead to the distortion types that are typically experienced with a shortened cyclic prefix, as described above. The AT may use any reverse link silence intervals as opportunities to advance (retard) its reverse link synchronization without shortening or lengthening the cyclic prefix or window length. Further, the different concepts described herein may be implemented alone or in combination. Therefore, the RL silence intervals may be implemented with or without the shortening or lengthening of the cyclic prefix or window length.

Figure 5B:
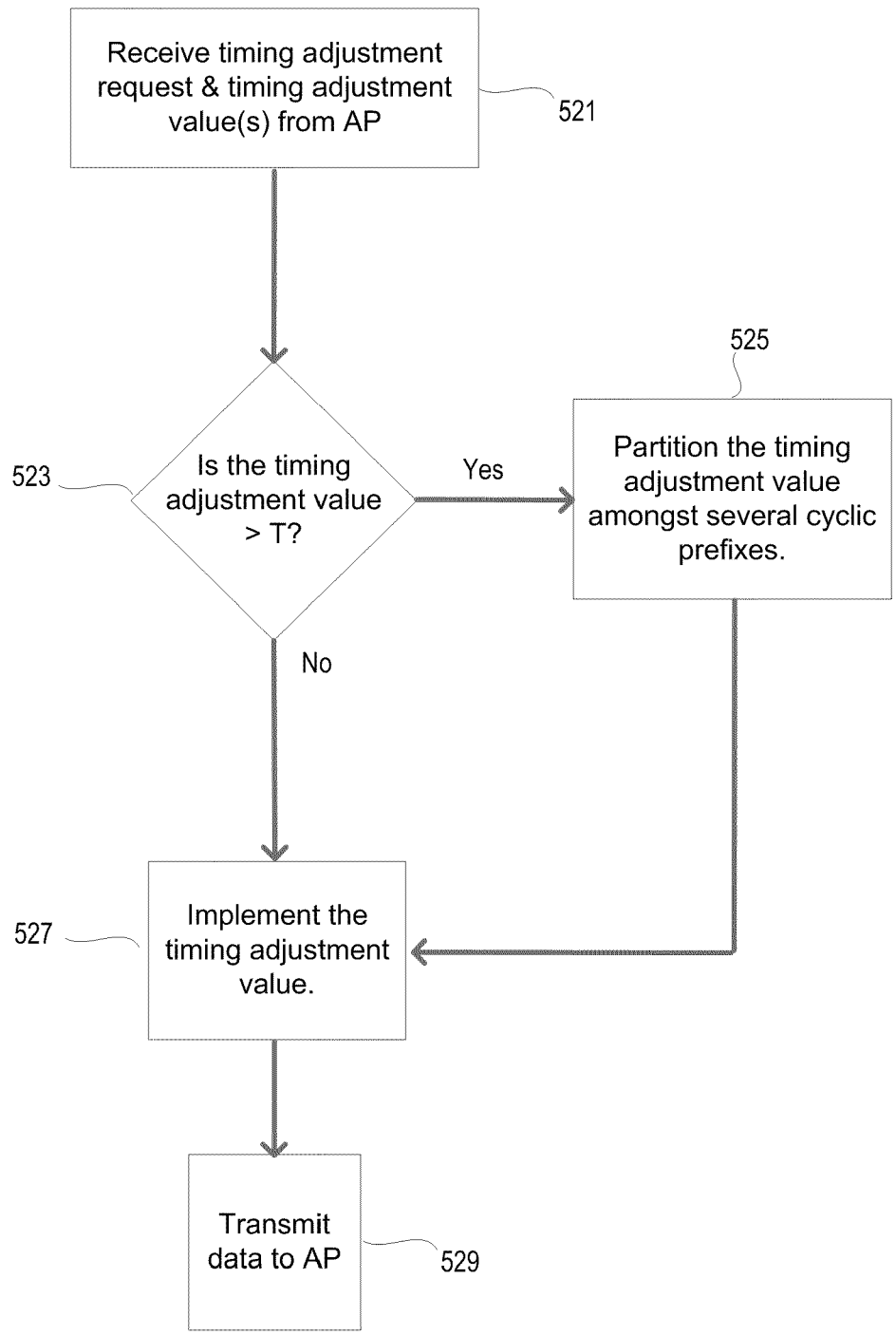

FIG. 5b illustrates an exemplary embodiment of adjusting the cyclic prefix length within the context of the AT(s), as one possible implementation of the methods described herein.

At step 521, the AT may receive a timing adjustment request and a timing adjustment value(s) from the AP. Thus, the AP is requesting that the cyclic prefix be adjusted in order to adjust the synchronization at the AP.

At step 523, the AT may determine if the timing adjustment value is larger than a value T. If the AT determines that the timing adjustment value is larger than T, then the process proceeds to step 525. If the AT determines that the timing adjustment value is smaller than T, then the process proceeds to step 527.

At step 525, the AT may partition the timing adjustment value of the cyclic prefix to span across several cyclic prefixes within a frame, as opposed to spanning a single cyclic prefix within a frame. This allows each partitioned timing adjustment value to be smaller than the value T. Therefore, the timing adjustment value of the cyclic prefix may be divided amongst several cyclic prefixes as opposed to being implemented with just a single cyclic prefix. Afterwards, the process proceeds to step 527.

At step 527, the AT may implement the timing adjustment of the cyclic prefix by utilizing the timing adjustment value. For example, the timing adjustment value may reduce the overall size of the cyclic prefix for a given frame or the timing adjustment value may increase the overall size of the cyclic prefix for a given frame.

At step 529, the AT may send data to the AP. Further, the data transmission sent to the AP from the AT(s) may reflect the timing adjustment of the cyclic prefix by utilizing the timing adjustment value.

For example, in one possible embodiment, upon receiving the timing correction message from, for example, an Access Point (AP), the Access Terminal (AT), for example, can advance (or retard) the reverse link synchronization time, by shortening (lengthening) the cyclic prefix of the OFDM or SC-FDM symbol frame. Therefore, if the AT receives a command from the AP to advance the reverse link RL transmission, the AT may not send the whole cyclic prefix with it's data transmission. Instead the AT may shorten the length of the cyclic prefix, so that RL transmission arrives at the AP earlier in time than if the cyclic prefix was not modified.

It is noted that FIG. 5b is one possible implementation of the concepts described herein and that other embodiments may exist. For example, the process described in FIG. 5b may be implemented by adjusting the OFDM or SC-FDM symbol windowing length to achieve a timing advance/retard effect. Furthermore, the process described in FIG. 5b may also be implemented by utilizing RL silence intervals as opportunities to advance/retard it's RL transmission. Further, the different concepts described herein may be implemented alone or in combination.

The concepts described in FIGS. 5a and 5b may be implemented in both a block hopping OFDM system or SC-FDM system and a symbol rate hopping OFDM system. In a block hopping OFDM or SC-FDM system, transmission may occur on a Frame-by-Frame basis, in which each Frame may consist of a set of OFDM or SC-FDM symbols, for example 8. Furthermore, pilots may be transmitted on the 1$^{st}$ or last OFDM or SC-FDM symbol of a Frame. In such systems, the AT may adjust the cyclic prefix of the 1$^{st}$ OFDM symbol or SC-FDM symbol of the frame (and not every OFDM symbol), such that the entire RL frame arrives in-sync with other AT(s). This approach may help channel estimation and demodulation at the AP for systems employing block hopping (e.g., UMB), where the pilots are sent on the 1st and last OFDM symbol of a RL frame, and data symbols are sent across the entire RL frame. However, for larger values of T, it is possible that pilots sent on the 1$^{st}$ OFDM symbol or SC-FDM symbol may experience some distortion due to a shortened cyclic prefix, but this is unavoidable.

Further, as discussed in steps 523 and 525 of FIG. 5b and steps 503 and 505 of FIG. 5a, if the reverse link timing advancement is greater than T, then the AT may choose to advance part of the timing every reverse link frame, such that the overall FL demod+RL modulator timelines are within the AT(s) capabilities.

For example, in a symbol rate hopping system, where pilots may be sent on every OFDM symbol, the AT may advance (retard) timing for every OFDM symbol. In a symbol rate hopping system, the pilot may be sent on every OFDM symbol, such that the timing advancement may be performed on a symbol-by-symbol basis, as opposed to on a frame-by-frame basis.

Figure 6A:
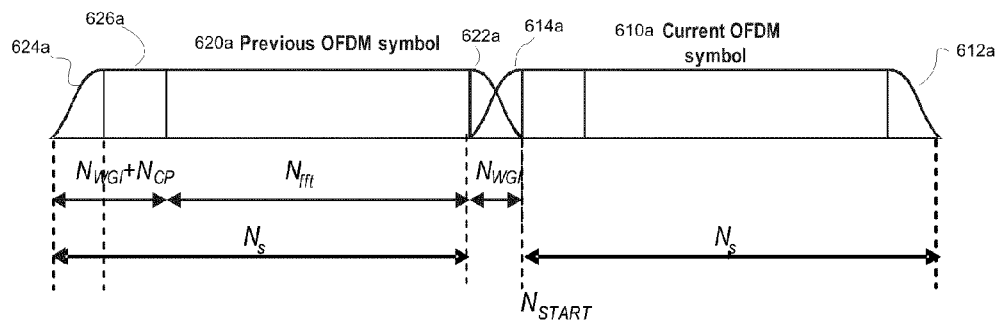
FIG. 6a is a sample illustration of two consecutive frames using, for example, OFDM symbols and their respective overlap in an exemplary embodiment.

FIG. 6a is a sample illustration of two consecutive frames using, for example, OFDM symbols and their respective overlap in an exemplary embodiment. Current OFDM symbol 610a contains a guard interval 612a at the "front" of the frame and guard interval 614a at the "rear" of the frame. Rear guard interval 614a overlaps with the front guard interval 622a of the previous OFDM symbol frame 620a. The previous OFDM symbol 620a is appended at its rear with guard interval 624a and also cyclic prefix interval 626a. The cyclic prefix 626a may be adjusted to compensate for timing and/or synchronization errors.

Figure 6B:
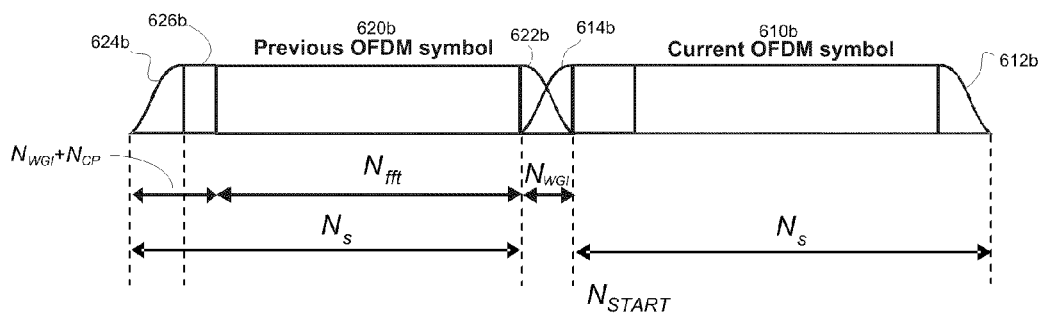
FIG. 6b is a sample illustration of two consecutive frames using, for example, OFDM symbols and their respective overlap in an exemplary embodiment.

FIG. 6b is a sample illustration of two consecutive frames using, for example, OFDM symbols and their respective overlap in an exemplary embodiment. The cyclic prefix interval 626b shown in FIG. 6b is shortened. When the cyclic prefix interval 626b is shortened, the current and previous OFDM symbols arrive at the AP earlier in time.

Figure 6C:
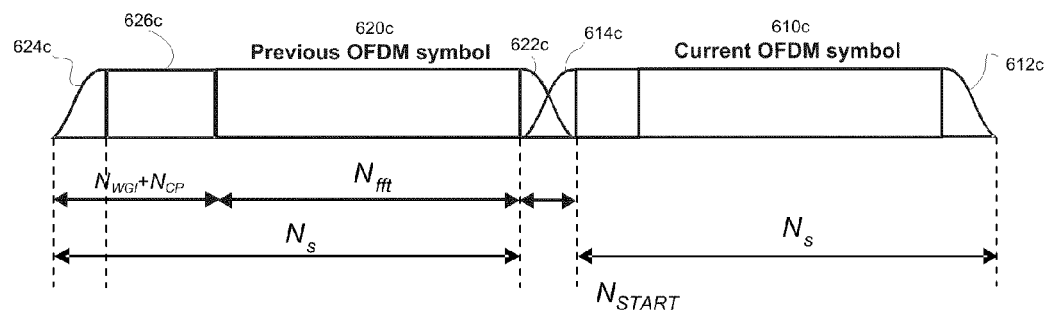
FIG. 6c is a sample illustration of two consecutive frames using, for example, OFDM symbols and their respective overlap in an exemplary embodiment.

FIG. 6c is a sample illustration of two consecutive frames using, for example, OFDM symbols and their respective overlap in an exemplary embodiment. The cyclic prefix interval 626c shown in FIG. 6c is lengthened. When the cyclic prefix interval 626c is lengthened, the current and previous OFDM symbols arrive at the AP later in time.

It is understood that the specific order or hierarchy of steps in the processes disclosed is part of an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, embodiments of the invention can include a computer readable media embodying methods for synchronizing transmit timing in a FDM system as described herein. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for adjusting timing in a Frequency Division Multiplexing (FDM) system, comprising:
   receiving a request to perform a timing correction;
   generating a time domain FDM symbol; and
   controlling the timing correction in the time domain FDM symbol by at least one of adjusting a length of a cyclic prefix, overlapping a portion of adjacent FDM symbols, adjusting a symbol windowing length, or utilizing a return link (RL) silence interval.

2. The method according to claim 1, wherein the RL silence interval is used to advance or backoff the RL transmission.

3. The method according to claim 1, wherein the cyclic prefix is adjusted for a single FDM symbol.

4. The method according to claim 1, wherein a plurality of cyclic prefixes are adjusted for a single timing correction.

5. The method according to claim 4, wherein the plurality of cyclic prefixes is adjusted, if the timing correction request exceeds a threshold.

6. The method according to claim 5, wherein the threshold is based on a fraction of a cyclic prefix length.

7. The method according to claim 5, wherein the threshold is about twenty-five percent of a cyclic prefix length.

8. The method according to claim 1, wherein the cyclic prefix is adjusted for a first FDM symbol in a frame having a plurality of FDM symbols.

9. The method according to claim 1, wherein the timing correction adjusts a guard interval duration in the overlapped portion of the adjacent FDM symbols.

10. The method according to claim 1, wherein the FDM system is at least one of an Orthogonal Frequency Division Multiplexing (OFDM) System or a Single Carrier-Frequency Division Multiplexing (SC-FDM) System.

11. An apparatus for synchronizing a Frequency Division Multiplexing (FDM) access terminal, comprising:
    means for receiving a request to perform a timing correction;
    means for generating a time domain FDM symbol; and
    means for controlling the timing correction in the time domain FDM symbol by at least one of adjusting a length of a cyclic prefix, overlapping a portion of adjacent FDM symbols, adjusting a symbol windowing length, or utilizing a return link (RL) silence interval.

12. The apparatus according to claim 11, wherein the RL silence interval is used to advance or backoff the RL transmission.

13. The apparatus according to claim 11, wherein the cyclic prefix is adjusted for a single FDM symbol.

14. The apparatus according to claim 11, wherein a plurality of cyclic prefixes are adjusted for a single timing correction.

15. The apparatus according to claim 14, wherein the plurality of cyclic prefixes is adjusted, if the timing correction request exceeds a threshold.

16. The apparatus according to claim 15, wherein the threshold is based on a fraction of a cyclic prefix length.

17. The apparatus according to claim 15, wherein the threshold is about twenty-five percent of a cyclic prefix length.

18. The apparatus according to claim 11, wherein the cyclic prefix is adjusted for a first FDM symbol in a frame having a plurality of FDM symbols.

19. The apparatus according to claim 11, wherein the timing correction adjusts a guard interval duration in the overlapped portion of the adjacent FDM symbols.

20. The apparatus according to claim 11, wherein the FDM system is at least one of an Orthogonal Frequency Division Multiplexing (OFDM) System or a Single Carrier-Frequency Division Multiplexing (SC-FDM) System.

21. An apparatus operable in a wireless communication system, the apparatus comprising hardware logic configured to:
    receive a request to perform a timing correction;
    generate a time domain FDM symbol; and control the timing correction in the time domain FDM symbol by at least one of adjusting a length of a cyclic prefix, overlapping a portion of adjacent FDM symbols, adjusting a symbol windowing length, or utilizing a return link (RL) silence interval.

22. The apparatus according to claim 21, wherein the logic configured to receive is a processor block, the logic configured to generate the time domain FDM symbol is an IFFT block, and the logic configured to control the timing correction is a baseband processing block.

23. The apparatus according to claim 21, wherein the cyclic prefix is adjusted for a single FDM symbol.

24. The apparatus according to claim 21, wherein a plurality of cyclic prefixes are adjusted for a single timing correction.

25. The apparatus according to claim 24, wherein the plurality of cyclic prefixes is adjusted, if the timing correction request exceeds a threshold.

26. The apparatus according to claim 25, wherein the threshold is based on a fraction of a cyclic prefix length.

27. The apparatus according to claim 21, wherein the RL silence interval is used to advance or backoff the RL transmission.

28. The apparatus according to claim 21, wherein the cyclic prefix is adjusted for a first FDM symbol in a frame having a plurality of FDM symbols.

29. The apparatus according to claim 21, wherein the timing correction adjusts a guard interval duration in the overlapped portion of the adjacent FDM symbols.

30. The apparatus according to claim 21, wherein the FDM system is at least one of an Orthogonal Frequency Division Multiplexing (OFDM) System or a Single Carrier-Frequency Division Multiplexing (SC-FDM) System.

31. A computer program product, comprising:
a non-transitory computer readable medium, comprising code for causing a computer to provide processing of communications signals, said code comprising:
instructions to receive a request to perform a timing correction;
instructions to generate a time domain FDM symbol; and
instructions to control the timing correction in the time domain FDM symbol by at least one of adjusting a length of a cyclic prefix, overlapping a portion of adjacent FDM symbols, adjusting a symbol windowing length, or utilizing a return link (RL) silence interval.

32. The computer-readable medium according to claim 31, wherein the RL silence interval is used to advance or backoff the RL transmission.

33. The computer-readable medium according to claim 31, wherein the cyclic prefix is adjusted for a single FDM symbol.

34. The computer-readable medium according to claim 31, wherein a plurality of cyclic prefixes are adjusted for a single timing correction.

35. The computer-readable medium according to claim 34, wherein the plurality of cyclic prefixes is adjusted, if the timing correction request exceeds a threshold.

36. The computer-readable medium according to claim 35, wherein the threshold is based on a fraction of a cyclic prefix length.

37. The computer-readable medium according to claim 35, wherein the threshold is about twenty-five percent of a cyclic prefix length.

38. The computer-readable medium according to claim 31, wherein the cyclic prefix is adjusted for a first FDM symbol in a frame having a plurality of FDM symbols.

39. The computer-readable medium according to claim 31, wherein the timing correction adjusts a guard interval duration in the overlapped portion of the adjacent FDM symbols.

40. The computer-readable medium according to claim 31, wherein the FDM system is at least one of an Orthogonal Frequency Division Multiplexing (OFDM) System or a Single Carrier-Frequency Division Multiplexing (SC-FDM) System.

41. A method for determining a timing correction in a Frequency Division Multiplexing (FDM) system, comprising:
receiving a transmission from an access terminal;
determining a timing correction based on the received transmission; and
transmitting the timing correction to the access terminal,
wherein if the determined timing correction exceeds a threshold, the method further comprises determining a plurality of timing corrections.

42. The method according to claim 41, wherein the plurality of timing corrections are determined for a single received transmission.

43. The method according to claim 41, wherein the threshold is based on a fraction of a cyclic prefix length.

44. The method according to claim 41, wherein the threshold is about twenty-five percent of a cyclic prefix length.

45. An apparatus for determining a timing correction in a Frequency Division Multiplexing (FDM) system, comprising hardware logic configured to:
receive a transmission from an access terminal;
determine a timing correction based on the received transmission; and
transmit the timing correction to the access terminal,
wherein if the determined timing correction exceeds a threshold, the hardware logic is further configured to determine a plurality of timing corrections.

46. The apparatus according to claim 45, wherein the plurality of timing corrections are determined for a single received transmission.

47. The apparatus according to claim 45, wherein the threshold is based on a fraction of a cyclic prefix length.

48. The apparatus according to claim 45, wherein the threshold is about twenty-five percent of a cyclic prefix length.

49. An apparatus for determining a timing correction in a Frequency Division Multiplexing (FDM) system, comprising:
means for receiving a transmission from an access terminal;
means for determining a timing correction based on the received transmission;
means for determining whether the determined timing correction exceeds a threshold;
means for partitioning the determined timing correction into a plurality of timing corrections when the determined timing correction exceeds the threshold; and
means for requesting the access terminal to implement the plurality of timing corrections.

50. A computer program product, comprising: a non-transitory computer-readable medium comprising code for: receiving a transmission from an access terminal; determining a timing correction based on the received transmission; determining whether the determined timing correction exceeds a threshold; partitioning the determined timing correction into a plurality of timing corrections when the determined timing correction exceeds the threshold; and requesting the access terminal to implement the plurality of timing corrections.

* * * * *